April 14, 1953     E. R. PRICE     2,634,838
TRANSMISSION OPERATING MECHANISM
Filed July 31, 1947     6 Sheets-Sheet 1

Fig. 1.

INVENTOR.
EARL R. PRICE
BY H. O. Clayton
ATTORNEY

April 14, 1953  E. R. PRICE  2,634,838
TRANSMISSION OPERATING MECHANISM
Filed July 31, 1947  6 Sheets-Sheet 2

INVENTOR
EARL R. PRICE
BY H. O. Clayton
ATTORNEY

April 14, 1953  E. R. PRICE  2,634,838
TRANSMISSION OPERATING MECHANISM
Filed July 31, 1947  6 Sheets-Sheet 3

INVENTOR.
EARL R. PRICE
BY H. O. Clayton
ATTORNEY

April 14, 1953 E. R. PRICE 2,634,838
TRANSMISSION OPERATING MECHANISM
Filed July 31, 1947 6 Sheets-Sheet 5

Inventor
EARL R. PRICE
H. O. Clayton
By
Attorney

April 14, 1953 E. R. PRICE 2,634,838
TRANSMISSION OPERATING MECHANISM
Filed July 31, 1947 6 Sheets-Sheet 6

Inventor
EARL R. PRICE
By H. O. Clayton
Attorney

Patented Apr. 14, 1953

2,634,838

UNITED STATES PATENT OFFICE 2,634,838

TRANSMISSION OPERATING MECHANISM

Earl R. Price, South Bend, Ind., assignor to Bendix Aviation Corporation, South Bend, Ind., a corporation of Delaware Application July 31, 1947, Serial No. 765,077

14 Claims. (Cl. 192—.073)

1

This invention relates in general to the power transmission mechanism of an automotive vehicle and in particular to means for operating the change speed transmission and the friction clutch of said mechanism.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission, and the operation of the friction clutch to facilitate said settings, being effected by power means if the driver elects this operation of the mechanism.

A further object of my invention is to provide, in an automotive vehicle including a fluid coupling, a friction clutch, and a three speeds forward and reverse transmission, means for operating and for facilitating the operation of said transmission, said means including power means, comprising a single acting motor, which is automatically operable after the accelerator is released, to establish the transmission either in its second gear setting or its high gear setting depending upon the speed of the vehicle, the friction clutch being operated and the throttle being controlled by said motor to facilitate this operation of the transmission, the operation of the clutch and transmission being effected in one cycle of operations.

The principal object of my invention, however, is to improve upon the aforementioned transmission and clutch operating mechanism by so constructing said mechanism that the clutch remains disengaged after the second gear setting of the transmission has been established thereby preventing a creeping of the car which would otherwise result if the clutch were engaged when the car has proceeded to a stop.

Yet another object of my invention is to provide, in the power plant of an automotive vehicle including a fluid coupling, a friction clutch and a change speed transmission, power means operable in one cycle of operations, for alternately establishing the change speed transmission in first one and then the other of two of its settings depending upon the speed of the vehicle. With this mechanism the friction clutch of said power plant is operated to facilitate the operation of the transmission provided however that said clutch is not automatically reengaged after one of the two aforementioned operations of the transmission when the vehicle is traveling at or below a certain speed.

The above and other objects and features of the invention will appear more fully hereinafter from a consideration of the following description taken in connection with the accompanying drawings wherein two embodiments of the invention are illustrated by way of example.

Figure 1:
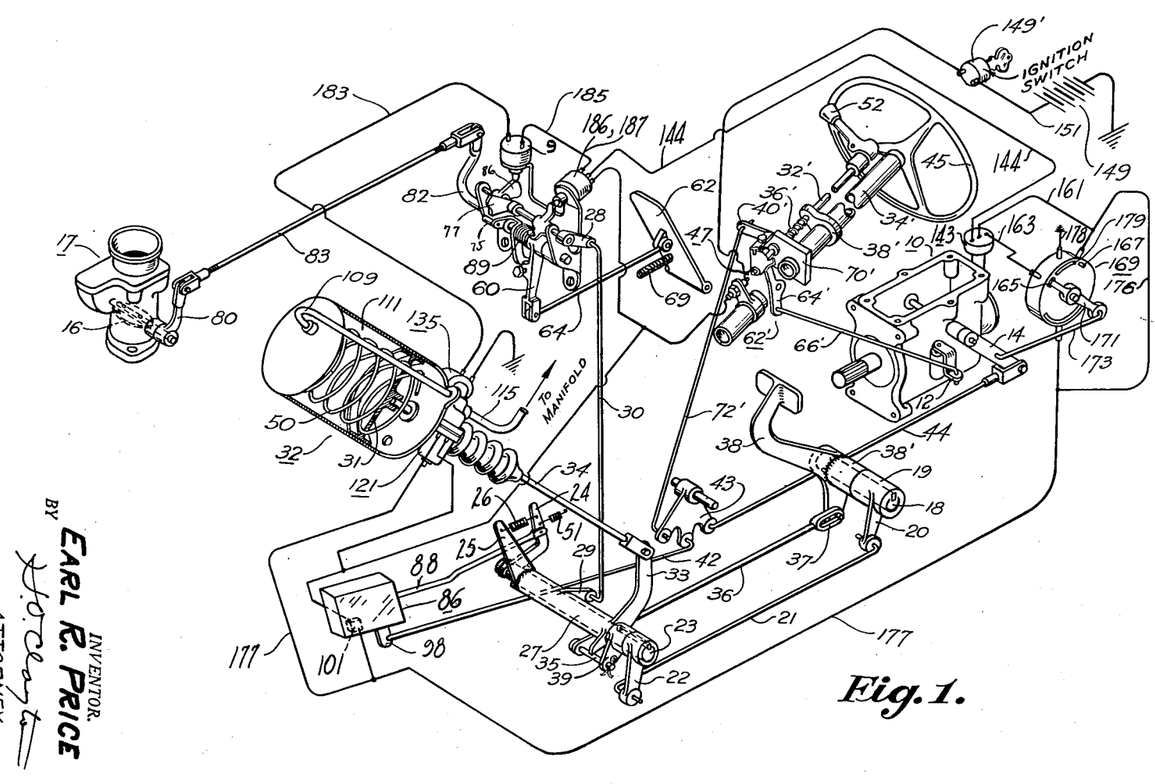
Figure 1 is a diagrammatic view of my invention disclosing the principal features thereof.

Referring now to Figure 1 disclosing a preferred embodiment of my invention, a three speeds forward and reverse transmission 10 is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14, for operating the engine throttle 16 of the carburetor 17, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of my invention also preferably includes, in the power plant of the vehicle, a fluid coupling such for example as that which was incorporated in several 1941 and 1942 passenger vehicles and said coupling includes an impeller and a vaned rotor the latter serving to drive the aforementioned driving plate of the clutch.

The friction clutch, not shown, is operably connected to a clutch throw-out shaft 18 to which is keyed a sleeve 19; and to a crank 20, fixedly secured to said sleeve, there is pivotally connected a rod 21. The rod 21 is pivotally connected to a crank 22 which is keyed to a shaft 23 and upon one end of the latter shaft there is rotatably mounted a crank 24. The latter crank is yieldingly connected to a crank 25 by means of a spring 26; and to the crank 25 there is connected a sleeve 27 rotatably mounted on the shaft 23. The sleeve 27 is operably connected to a crank 28, Figures 1 and 3, by means of a crank 29 fixedly secured to said sleeve, and a rod 30 which is pivotally connected to the cranks 28 and 29.

The sleeve 27 is operably connected to a piston 31 of a pressure differential operated motor 32, by means of a two-armed crank 33 fixedly connected to said sleeve; and by means of a rod 34 pivotally connected at one of its ends to the longer arm of the crank 33 and secured at its other end to said piston. The shorter of the two arms of the crank 33 abuts a pin 35 which is rotatably mounted, at one of its ends, in one end of a rod 36 said rod being connected at its other end, by a lost motion connection 37, to a manually operable clutch pedal 38. This pedal, constructed as a two-armed crank member, is rotatably mounted on the shaft 18 and is fixedly secured to a sleeve 38' which is also rotatably mounted on said shaft. The other end of the pin 35 is pivotally connected to a crank 39 which is keyed to the shaft 23.

There is thus provided manually and power operated means for operating the clutch, the clutch pedal 38, by virtue of the operation of the lost motion connection 37, remaining stationary when the motor 32 is energized to disengage the clutch.

Describing now the connection between the motor 32 and the transmission operated crank 14, as is described above the piston 31 of said motor is operably connected to the crank 24; and said crank 24 is connected to the transmission operating crank 14 by means of an alternator, that is, direction changing mechanism indicated as a whole in Figure 1, by the reference numeral 86.

Figure 12:
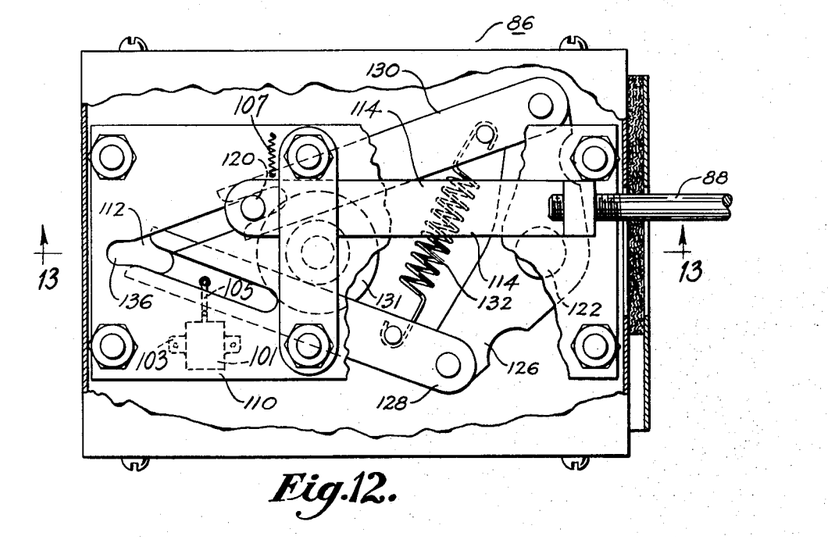
Figure 12 is a side view disclosing details of the alternator, that is, direction changing mechanism of my invention.
Figure 13:
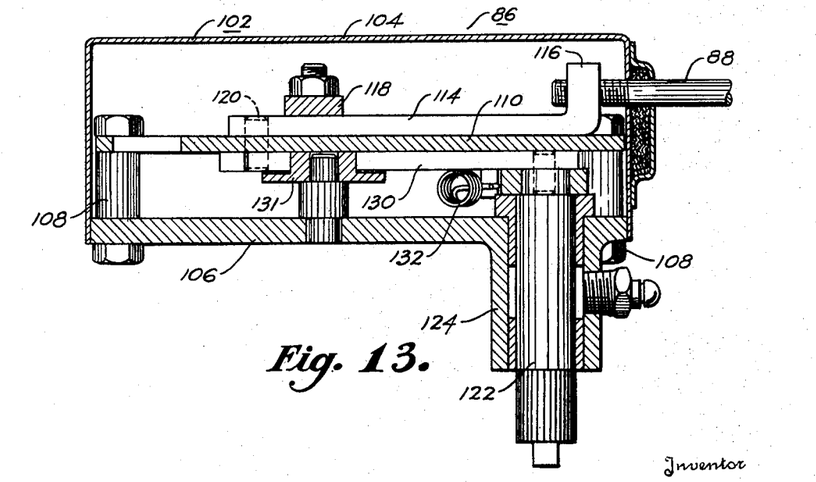
Figure 13 is a sectional view, taken on the line 13—13 of Figure 12, disclosing other details of said alternator.

Describing now the details of the alternator 86, the same includes a casing 102, Figure 12 of two parts 104 and 106. To the casing part 106 there is detachably secured by bolts 108 a plate 110 having a V-shaped guide slot 112 therein, and a thrust member 114 adjustably secured at 116 to a link 88 and positioned between a strap 118 and the outer face of the plate 110, is provided with a laterally extending pin 120 which extends through the aforementioned V-shaped slot. To the outer end of a rotatable shaft 122 journalled in a boss 124 extending from the casing part 106 there is drivably connected a crank 98, Figure 1; and to the inner end of the shaft 122 there is drivably connected a bell crank lever 126. To one end of the latter lever there is pivotally connected a high gear thrust link 128 which is recessed at its outer end to receive the pin 120; and to the other end of the lever 126 there is pivotally connected a second gear thrust link 130 which is also recessed at its outer end to receive the pin 120; and the two thrust links are biased towards each other into contact with a guide roller 131 by a spring 132 connected to both of said links.

An important feature of my invention lies in the provision of a solenoid 101 secured by bracket 103 within the alternator casing. A pin 105 operated by the armature of said solenoid is pivotally connected to the high gear thrust link 128, all as disclosed in Figure 12 and as will be described in greater detail hereinafter. When the solenoid 101 is energized, an operation which is effected when the accelerator is released and the vehicle is traveling below governor speed, the high gear thrust link 128 is rotated downwardly and out of the way of the pin 120 thereby preventing the thrust member 114 from latching with the link 128 to effect a high gear setting of the transmission.

Describing the operation of the above described alternator 86, when the fluid pressure motor 32 is de-energized a return spring 51 connected to the crank 24, serves to move the link 88 and thrust member 114 connected thereto to the left, Figure 12, to position the pin 120 within a recess 136 constituting the apex of the aforementioned V-shaped guide slot 112; then when the motor 32 is energized to effect an operation of the transmission and clutch, the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 12 this operation of the lever 98 serves to bodily move the then inoperative thrust link into position preparatory for its operation to rotate the lever 126.

A spring 107 may be included in the mechanism said spring serving to bias the thrust member 114 upwardly, Figure 12. As to the function of the spring 107 should the motor 32 be de-energized during its operation of establishing the transmission in its second gear setting, that is, de-energized when the piston 50 is in its midstroke position during this operation; then by virtue of the spring 107 the subsequent re-energization of said motor will result in the completion of the second gear setting of the transmission.

There is thus provided an alternator that is, direction changing mechanism whereby the transmission operating angular movement of the crank 14 is alternately reversed with each successive operative movement of the crank 126.

Describing now that part of the mechanism of my invention which is actuated by a manually operated gear shift lever 52, Figure 1, said mechanism includes a rotatable and bodily movable shaft 32' extending alongside the steering column 34' of the vehicle. As is disclosed in Figures 1, 8 and 9, the shaft 32' is biased downwardly by a spring 36' positioned between a stop 38' mounted on the steering column and a crank member 40' which is operably connected to said shaft by means of a clutch mechanism 42' described hereinafter. The shift lever 52 mounted beneath the steering wheel 45 is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32' is also such that the cross-shift movement of the shift lever, that is the movement in a plane perpendicular to the plane of the steering column, results in a movement of the shaft 32' to either effect a shift rail selecting operation of the crank 12 or effect a declutching operation of the clutch 42' and a closing of a selector switch 47 to prepare the mechanism for its power operation.

Describing the aforementioned clutch mechanism 42', said mechanism includes a member 44' sleeved over the lower end of the shaft 32', said member being permanently secured in place to the crank 40'. The lower end portion of the member 44' is provided with a flange 46' which is recessed at 48', Figure 8, to provide a keyway for a key portion 50' of a spool-shaped end portion of a clutch member 52', said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool-shaped portion of the clutch member 52' and the lower arm 64' of said lever is pivotally connected, by a link 66', to the shift rail selecting crank 12. As is disclosed in Figure 8, the spring 36' serves to bias the clutch 42' and shaft 32' as a unit downwardly, the movement being limited by a stop 68', Figure 9, constituting a part of a steering column mounted bracket member 70'; and in this position of the clutch 42' the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is, a selection of the low and reverse gear shift rail of the transmission, the driver lifts the shift lever 52 upwardly in a plane perpendicular to the plane of the steering wheel; and this operation serves to rotate the bell crank lever 62' in a counter-clockwise direction, Figure 8, the spring 36' being compressed and the flange 46', Figure 9, being moved into engagement with the stop 68'. To actuate the shift rail operating crank 14 to neutralize the transmission or establish the same in any one of its four gear ratio settings, the driver rotates the shift lever 52 in a plane parallel to the plane of the steering wheel thereby effecting an angular movement of the crank 40' which is preferably connected to the crank 14 by force transmitting means including link 72', the aforementioned three-armed lever 43 and the link 44.

There is thus provided, by the above described mechanism, means for manually operating a three speeds forward and reverse transmission; and in this manual operation of the transmission the shift lever 52 is movable to six different positions, said selective movement outlining the letter H.

Figures 3, 4, 14:
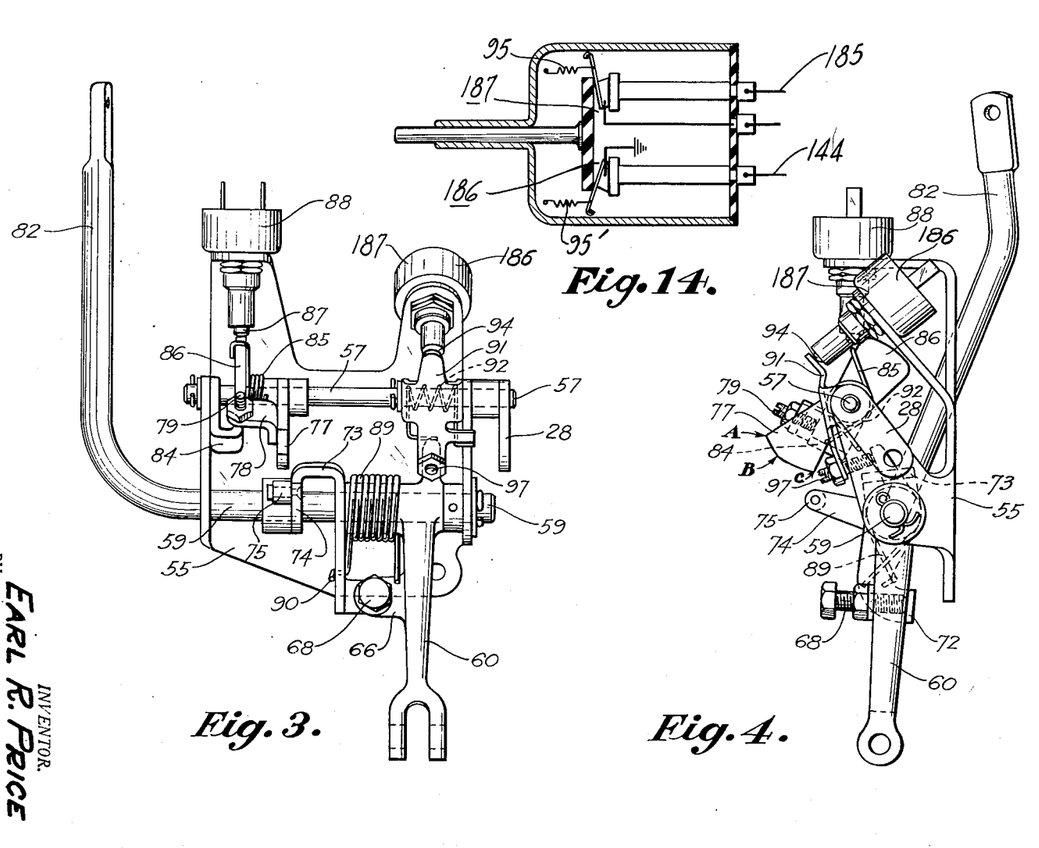
Figure 3 is a front view disclosing details of a part of the motor operated controls and also disclosing the accelerator operated switch of my invention.
Figure 4 is a side view of the mechanism disclosed in Figure 3.
Figure 14 is a sectional view disclosing the details of the accelerator operated control switch mechanism.

Referring now to Figures 3 and 4 there is disclosed therein details of certain other controls of the mechanism disclosed in Figure 1. A support member 55 serves as a mounting for a shaft 57 and a shaft 59 said shafts being journalled in the sides of said support member. The shaft 59 is operably connected to the throttle valve 16 by cranks 80 and 82 and a link 83. A two-armed crank 60, rotatably mounted on the shaft 59 and operably connected to the accelerator 62 of the car by a link 64 is provided with a laterally extending flange 66 within which is adjustably mounted stop member 68. This stop member is biased, by the operation of an accelerator return spring 69, into engagement with a flange member 72 extending laterally from a U-shaped fitting 73 fixedly secured to the shaft 59. From the fitting 73 there extends a flange 74 which is provided at its end with a roller member 75. This roller member is contacted by a cam 77 which is fixedly mounted on the shaft 57; and mounted alongside the cam 77 there is provided a support 78 which is also fixedly mounted on the shaft 57. There is adjustably mounted in the support 78 a set screw 79 adapted at its inner end to contact a U-shaped member 84 which is rotatably mounted on the shaft 57 and which is biased clockwise into engagement with the set screw 79 by a spring 85. A cam 86, secured to the member 84, contacts a pin 87 extending from the movable contact, not shown, of a breaker switch 9; and this contact is biased, by a spring, not shown, to its switch open position and is moved to its switch closed position by the spring operated cam 86 which is shaped to effect a closing of the switch during a part of the clutch engaging movement of the motor piston 31. There is provided by the switch 9 and the cam means for operating the same, means for controlling the operation of a choke valve operating solenoid 135, Figure 7, to effect a controlled clutch engaging operation of the motor 32. The parts, including the contour of the face of the cam 86, are preferably so constructed and arranged and so operative that the solenoid 135 is energized, to move a valve member 131 away from a seat 137, during the clutch engaging movement of the piston 31 said operation being effected just as the piston reaches the point of clutch plate contact; and as stated above the parts are also so constructed and arranged and so operative that the switch 9 is subsequently opened, to effect a de-energization of the solenoid 135, during said clutch engaging movement of said piston. When the valve 131 is moved off of a seat 139, Figure 7, air rushes into the motor 32 at a relatively high rate to thereby effect a relatively rapid clutch engaging movement of the clutch driven plate, and when the valve 131 is seated, as is disclosed in Figure 7, air flows into the motor 32 via a relatively small opening 10'. The solenoid 135 and valve means for controlling the operation of the motor 32, are described in greater detail hereinafter.

Continuing the description of the mechanism disclosed in Figure 3 a coil spring 89, sleeved over the hub of the crank 60, is connected at one of its ends 90 to the member 73 and the other end of said spring abuts the outer face of the flange 66 on said crank. There is thus provided by the spring 89 and cooperating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 31, the cam 77 is rotated counter-clockwise, Figure 4, thereby providing, by its end portion A, B a stop to prevent a clockwise rotation, that is throttle opening movement, of the accelerator operated flange 74. And it is to be noted at this juncture that when the accelerator is depressed to cock the spring 89 and the motor 32 is de-energized to effect a re-engagement of the clutch, the cam 77 is rotated clockwise, Figure 4, to effect a controlled opening of the throttle as the clutch plates move into contact with each other, a segment B, C of said cam being shaped to effect this operation. Preferably all points along the segment A, B of the cam 77 are equally distant from the center of rotation of said cam; and the radius of the cam from the point B to the point C progressively decreases. There is thus provided, by the operation of the sector A, B of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B, C of said cam serves to make possible a progressively increased opening of the throttle, by the operation of the accelerator loaded spring 89, as the clutch plates move into driving engagement with each other.

Completing the description of the mechanism of Figure 3 a switch operating member 91, rotatably mounted on the shaft 57, is biased, by a coil spring 92, to rotate in counter-clockwise direction, Figure 4; and the lower end of the member 91 is adjustably connected to the upper arm of the two-armed crank 60 by means of a set screw 97 which is adjustably mounted on the member 91. The upper end of the switch operating member 91 abuts the lower end of a pin 94 which is connected to the movable contact of breaker switches 186 and 187, Figure 14. The breaker switch 9 is of standard construction, accordingly the same is not disclosed in detail. This switch preferably includes a movable contact and a fixed contact, the movable contact being biased to its switch open position by a spring within the switch; and in the case of the accelerator operated switches 186 and 187 springs 95 and 95' are overcome, to close said switches, by the operation of the accelerator return spring 69. In other words the switches 186 and 187 are closed when the driver removes his foot from the accelerator to close the throttle.

Figures 5, 6, 7:
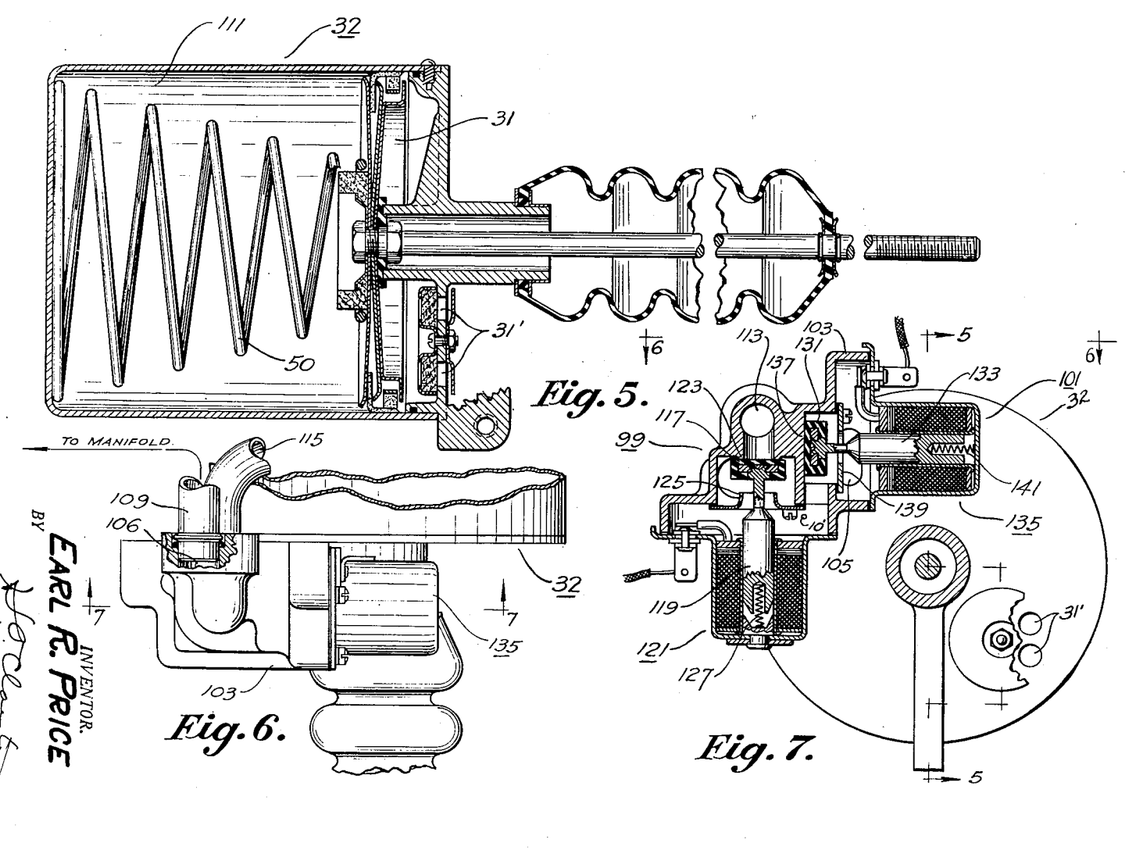
Figure 5 is a sectional view, taken on the line 5—5 of Figure 7, disclosing details of the pressure differential operated motor of my invention.
Figure 6 is a view, partly in section and taken on the line 6—6 of Figure 7, disclosing details of the air transmitting ducts constituting part of the motor unit disclosed in Figures 5 and 7.
Figure 7 is a view, largely in section, disclosing details of the solenoid operated valves for controlling the operation of the motor unit in Figure 5.

The valve means for controlling the operation of the motor 32 is disclosed in detail in Figure 7 and includes a three way valve unit 99 and a choke valve unit 101. Both units are housed within a casing 103 preferably mounted on the casing of the motor 32. The casing 103 is preferably ported at 105 to provide a vent to the atmosphere, at 106 to receive a duct 109 leading to a control compartment 111 of the motor, and at 113 to receive a conduit 115 leading to the intake manifold of the internal combustion engine of the vehicle or other source of vacuum. The three way valve unit 99 includes a valve member 117 operably connected to the armature 119 of a solenoid 121 which is secured to the casing 103. When the solenoid 121 is energized the valve member 117 is moved downwardly, Figure 7, to leave a seat 123 and abut a seat 125; and when said solenoid is de-energized a spring 127 serves to return the valve member to its seat 123. The choke valve unit 101 includes the aforementioned valve member 131 which is operably connected to the armature 133 of a solenoid 135 secured to the valve casing 103. As previously briefly described when the solenoid 135 is energized the valve member 131 is moved off of a seat 137 onto a seat 139; and when the solenoid 135 is de-energized a spring 141 serves to return the valve member 131 to its seat 137. The electrical means for controlling the operation of the solenoids 121 and 135 constitutes an important feature of my invention, said electrical means being disclosed in Figure 2. Describing this control means a movable contact 147, Figure 11, of a single pole double throw switch 143 operated by a vehicle speed responsive centrifugally operated governor 145 is electrically connected, by a conductor 144, with the grounded accelerator operated switch 186, said switch being disclosed in detail in Figure 14. The switch 186 is closed by the spring 95' when the accelerator is released. A fixed contact 159 of the switch 143 is connected, by a conductor 163, with a fixed contact 165 of a motor operated selector switch 169, Figure 1, and a fixed contact 157 of the switch 143 is connected, by a conductor 161, with a fixed contact 167 of the switch 169. A movable contact member 171 of the switch 169 is at all times in contact with a fixed contact 175 which is electrically connected with the solenoid 121 by a conductor 177; a conductor 176 provides a shunt circuit to interconnect the fixed contact 167 with the conductor 177. The contacts 165 and 171, contact 171 and a fixed contact 179 and the contacts 167 and 171 of the switch mechanism 169 provide three separate switches; and the movable contact 171 is so connected with the transmission operating crank 114 that the switch 167, 171 is closed when the transmission is established in its high gear setting; the switch 165, 171 is closed when the transmission is established in its second gear setting; and the switch 171, 179 is closed except when the transmission is completely, or substantially completely established in either its second or high gear setting.

Figure 2:
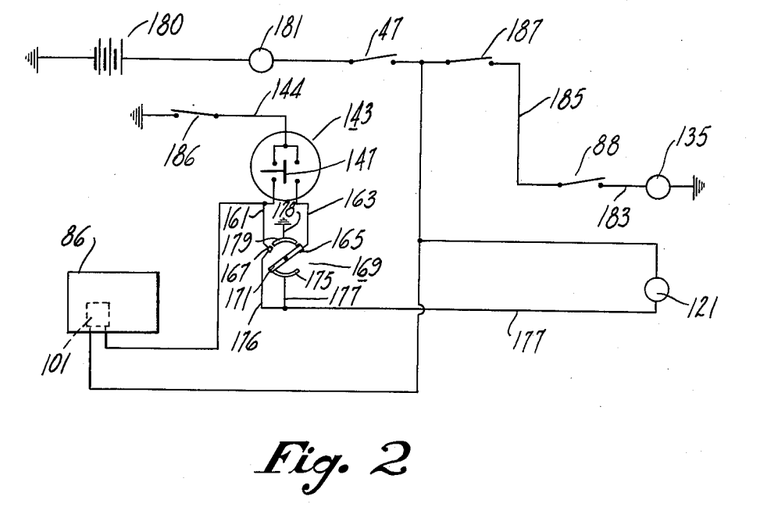
Figure 2 is a wiring diagram of the electrical mechanism disclosed in Figure 1.

Completing the description of the electrical controls of Figure 2, the fixed contact 179 of switch 169 is grounded by a conductor 178; the grounded clutch control bleed valve solenoid 135 is electrically connected in series with a grounded battery 180, the conventional ignition switch 181 of the electrical controls of the power plant, the shift lever operated selector switch 47, the accelerator operated switch 187 which is closed when the accelerator is released, and the clutch motor operated switch 9; the three-way valve operating solenoid 121 is electrically connected in series with the selector switch 47, the ignition switch 181 and grounded battery 180; and the aforementioned alternator operating solenoid 101 is electrically connected in series with the grounded battery 180, the ignition switch 181, the selector switch 47, the governor operated switch 147, 157 and the grounded accelerator operated switch 186.

Figure 8:
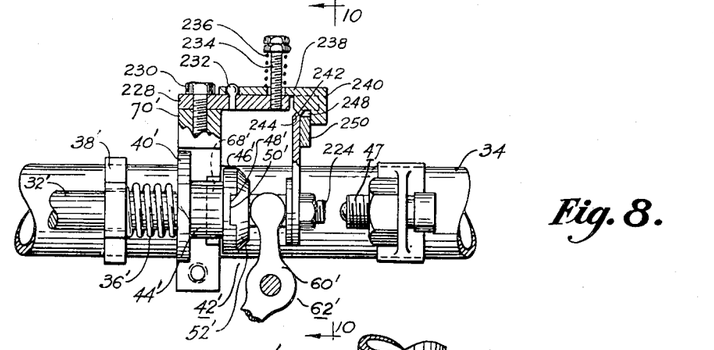
Figure 8 is an enlarged view of the mechanism at the base of the steering column, said mechanism serving to disconnect the shift lever from the power operated transmission operating linkage.
Figure 9:
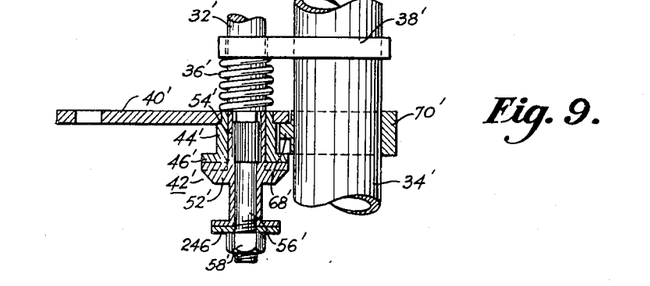
Figure 9 is a sectional view, taken on the line 9—9 of Figure 10, disclosing certain features of the mechanism disclosed in Figure 8.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 38 to disengage the clutch and will then operate the shift lever 52 to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 52, which at the time is in its second gear setting, is rotated downwardly that is angularly in a clockwise direction in a plane perpendicular to the plane of the steering wheel; and this operation serve to bodily move the shaft 32 downwardly until a switch operating member 224, Figure 8, is in contact with the switch 47 to close the same. This operation constitutes a declutching operation the clutch mechanism 42', the clutch member 52' moving away from the clutch member 44' the movement of the latter being prevented by the stop 68'.

Figure 10:
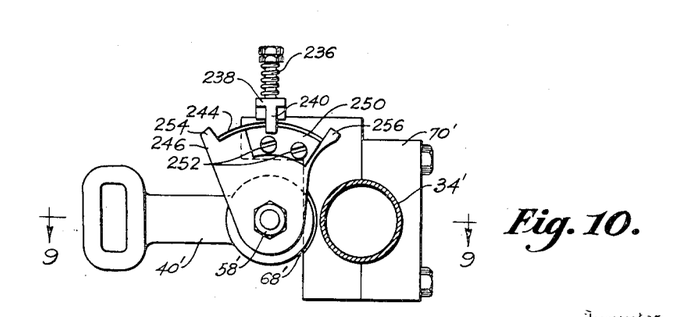
Figure 10 is a front view, taken on the line 10—10 of Figure 8, of the mechanism disclosed in Figure 8.

Referring to Figures 8 and 10 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234, and a spring 236, a movable latch member 238 shaped at its outer end to provide a relatively narrow stop member 240. Now when the shift lever 52 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56', Figure 9, between the lower flange portion of the clutch member 52' and the nut 58'; and this operation serves to position said peripheral edge portion 244 in the space indicated by the reference numeral 248, Figure 8. Incidentally the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 10, that a rectangular shaped stop member 250, secured to the outer face of the stop member 246 by screws 252, is in contact with the member 240 when the parts are in their transmission neutral position and when the spring 36' has operated to move the crank 12 to its second and high shift rail position, that is the position preparing the transmission for either second or high gear operation. It follows therefore that the stop member 246 must be rotated clockwise in Figure 10 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 10 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 288 and 238 when the shift lever is moved to either its low or high gear position.

Figure 11:
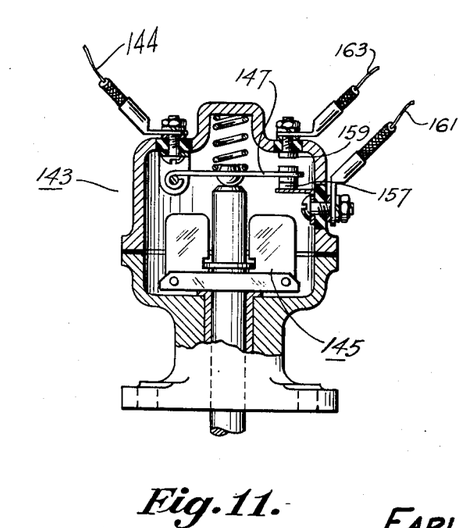
Figure 11 is a view disclosing details of the governor operated switch of the mechanism of my invention.

Continuing the description of the operation of the mechanism the driver having moved the shift lever to its automatic position and assuming that the car is traveling above governor speed to close the switch 147, 159, Figure 11, the transmission will then be automatically established in its high gear setting after the driver releases the accelerator to close the switch 186; for with this operation an electrical circuit is completed via the grounded battery 180, the ignition switch 181, the then closed selector switch 47, the solenoid 121, the switch 147, 159 of the governor operated switch 143, the switch 165, 171 of the switch mechanism 169, and the grounded accelerator operated switch 186. The resulting operation of the three way valve 99, Figure 7, effects an energization of the motor 32 the piston 31 of the said motor being then subjected to a differential of pressures to move the same to the left, Figures 1 and 5. The right side of the piston 31 is at all times subjected to the pressure of the atmosphere via screened openings 31' in one end of the motor 32; and the left side of said piston, that is, the side constituting a wall of the compartment 111, is subjected to a relatively low gaseous pressure when the three way valve 99 is opened to interconnect said compartment with the intake manifold or other source of vacuum. When the latter valve is closed, that is, when the solenoid 121 is de-energized, the compartment 111 is vented to the atmosphere through said valve and the spring 50 within said compartment is then operative to move the piston 31 to the right, Figure 1, to permit a re-engagement of the friction clutch by the operation of its springs.

Describing now the clutch disengaging, transmission operating and throttle controlling operation of the motor 32, the above referred to leftward movement of the piston 31 serves, during the first increment of movement of the piston, to rotate the crank 20 to disengage the clutch and rotate the cam 77 counterclockwise to bring the stop portion A, B of said cam opposite the accelerator operated crank 74; and as this operation is being effected the spring 26 is expanded inasmuch as the rod 44 can not be moved to operate the transmission until after the driving torque is reversed, that is, until after the clutch is disengaged. Now immediately after the clutch plates are moved out of contact with each other to reverse the driving torque the above described force transmitting means interconnecting the spring loaded crank 24 and the crank 14 becomes operative to move the latter crank and establish the transmission in its high gear setting; and as this operation of the transmission is being completed the transmission switch 169 is operated to make the switch 167, 171 and to break the switch 171, 179. The switch 165, 171, is broken during the first increment of movement of the piston 50; and the switch 171, 179 and its connection with the circuit between the switch 186 and the battery insures a completion of the high gear transmission operating operation of the motor 32 once initiated and despite a certain operation of the governor operated switch 143 which breaks the electrical connection between the switches 186 and 169 during said operation. The latter operation of the switch 143 is effected if the car brakes are suddenly applied to bring the car down below governor speed as the motor 32 is operating to establish the high gear setting of the transmission. If this unusual operation of the mechanism is effected then the driver, in order to effect a reengagement of the clutch after the transmission is established in high gear, must depress the accelerator to open the switch 186 after the switch 167, 171 is closed. Now the breaking of the switch 186 results in a de-energization of the solenoid 121 and as described above this results in a de-energization of the motor 32 to initiate a preselecting operation of the alternator, and a controlled opening of the throttle.

The transmission will now remain in its high gear setting until the accelerator is again released whereupon the motor 32 will again be energized to establish the transmission in its second gear setting and to operate the clutch and throttle to facilitate said operation.

If the car is then brought to a stop the mechanism of my invention will be operated to establish the transmission in its second gear setting however after this particular setting is effected the motor 32 will not be automatically deenergized to reengage the clutch and operate the alternator 86; for as will be noted from an inspection of the electrical mechanism of Figure 2, the conductor 176 interconnecting the conductor 177 and the fixed contact 167, serves to maintain the electrical circuit effecting an enerization of the solenoid 121. Thus with the accelerator released and the car travelling below governor speed or at a standstill, the motor 32 remains energized to maintain the clutch disengaged thereby preventing a fluid coupling operated creeping of the car which would result if the clutch were engaged; however, the driver may at this time effect a reengagement of the clutch by depressing the accelerator thereby opening the switch 186 and breaking the electrical circuit to the solenoid 121; and this operation will effect a clutch engaging operation of the motor 32 to resume the forward motion of the car. If the driver should then release the accelerator before the governor speed is exceeded, the solenoid 101 will be re-energized to prevent the pin 120 from engaging with the high gear thrust link 128, thereby preventing a high gear operation of the power means of my invention. The spring 107 will at this time serve to keep the pin 120 in the upper portion of the V slot 112 of Figure 12.

There is thus provided by the mechanism of my invention a relatively simple manually and power operated means for operating the three speeds forward and reverse transmission of an automotive vehicle, the friction clutch of the vehicle and the throttle also being operated by said means to facilitate the operation of the transmission. With the mechanism of my invention, the transmission may be completely manually operated; and if the driver desires an automatic operation of the transmission, he merely has to place the shift lever in a certain position whereupon the motor 32 takes over the operation to shuttle the transmission back and forth between its second and high gear settings, the clutch and throttle being operated to facilitate these operations; and the fluid coupling of the power plant also facilitates said operations.

The electrical controls of my invention, Figure 2, including the series connected grounded accelerator switch 186, the governor operated single pole double throw switch 143, the motor operated selector switch mechanism 169, and the motor controlling solenoid 121, provide a simple and effective means for controlling the operation of the clutch, transmission and throttle controlling motor 32. It is to be noted that the switch 169 preselects the succeeding operation of the electrical controls and that the provision of the switch 171, 179 in the controls insures a completion of the operation of the motor once initiated. The controls of Figures 3 and 4 provide means for effecting a stage clutch engaging operation of the motor 32 if the accelerator remains closed during the operation of the mechanism; however if the accelerator is depressed during said operation then the cam 77 comes into play to control the opening of the throttle.

However the most important feature of my invention lies in the means, including the shunt circuit 176 and the solenoid 101, for preventing an automatic operation of the power mechanism to re-engage the clutch after the transmission has been established in its second gear setting, thereby preventing a fluid coupling operated creep of the vehicle; and said means also serves to disable the alternator 86 thereby preventing a high gear operation of the mechanism should the accelerator be depressed and then released when the vehicle is travelling below governor speed, that is, below the speed necessary to effect the aforementioned second gear setting of the transmission.

Although only one embodiment of the invention has been illustrated and described, various changes in the form and relative arrangements of the parts may be made to suit requirements.

I claim:

1. In an automotive vehicle provided with an accelerator, a three speeds forward and reverse transmission and a friction clutch; means for operating said transmission to alternately establish the same in first one and then the other of two of its settings and for operating the clutch to facilitate the operation of said transmission, said means including a pressure differential operated motor operably connected to the clutch and transmission, valve means for controlling the operation of said motor, and electrical means for controlling the operation of said valve means including a valve operating solenoid, a grounded accelerator operated switch, a governor operated single pole double throw switch having its movable contact wired to the accelerator operated switch, a switch operated by the motor, said switch being wired to the governor operated switch and to the solenoid, a manually operated selector switch and a grounded battery, the solenoid, battery and four switches being electrically connected in series with each other.

2. In an automotive vehicle provided with an accelerator, a three speeds forward and reverse transmission and a friction clutch; means for operating said transmission to alternately establish the same in first one and then the other of two of its settings and for operating the clutch to facilitate the operation of said transmission, said means including a pressure differential operated motor operably connected to the clutch and transmission, valve means for controlling the operation of said motor, and electrical means for controlling the operation of said valve means including a valve operating solenoid, an accelerator operated switch, a governor operated single pole double throw switch having its movable contact wired to the accelerator operated switch, a switch operated by the motor including four fixed contacts and a movable contact for selectively interconnecting one of said fixed contacts with any of the three remaining fixed contacts, a manually operated selector switch and a grounded battery, said solenoid, battery and switches being electrically connected in series with each other.

3. In an automotive vehicle provided with a three speeds forward and reverse transmission, an accelerator and a gear shift lever; manually and power operated means for operating the transmission including a pressure differential operated motor operable to establish said transmission in its second and high gear settings, a vehicle speed responsive governor, valve means for controlling the operation of said motor, and interconnected electrical means for controlling the operation of said valve means, said electrical means including a solenoid, a gear shift lever operated switch, an accelerator operated switch, a switch operated by the aforementioned governor, and a motor operated switch, said transmission operated switch being operative, once the aforementioned switches are operated to effect an energization of said solenoid, to insure a continuance of the energization of said solenoid until the motor has completed its operation of establishing the transmission in gear and despite an operation of the governor operated switch to break the electrical connection to said solenoid during said operation of the motor.

4. In an automotive vehicle provided with a three speeds forward and reverse transmission, an accelerator and a gear shift lever; manually and power operated means for operating the transmission including a pressure differential operated motor operable to establish said transmission in its second and high gear settings, a vehicle speed responsive governor, valve means for controlling the operation of said motor, and interconnected electrical means for controlling the operation of said valve means including a solenoid, a gear shift lever operated switch, an accelerator operated switch, a switch operated by the aforementioned governor, and a switch operated by the motor and including a plurality of fixed contacts and a movable contact, two of the fixed contacts being electrically connected to the governor operated switch and another of said fixed contacts being wired directly to the solenoid.

5. In an automotive vehicle provided with a three speeds forward and reverse transmission, an accelerator and a gear shift lever; manually and power operated means for operating said transmission including a pressure differential operated motor, a crank extending from the transmission casing said crank, when actuated subsequent to a cross-shaft setting of the transmission, serving to establish the transmission either in its second gear setting or its high gear setting; means interconnecting the crank with the power element of the motor and operative, by an operation of the motor, to alternate the direction of angular movement of said crank to thereby effect the aforementioned successive second and high gear operations of the transmission, valve means for controlling the operation of said motor, a solenoid for actuating said valve means, and means for controlling the operation of said solenoid including a vehicle speed responsive governor, a switch mechanism operated by said governor, an accelerator operated switch, a gear shift lever operated selector switch, and a switch mechanism operated by said crank and cooperating with the aforementioned switch mechanisms to effect an energization of the solenoid to thereby effect an operation of the motor, the parts of the crank operated switch mechanism being so constructed and arranged and so electrically connected with the governor operated switch mechanism and the solenoid that the latter once energized, remains energized until the transmission is established in gear whereupon the solenoid is de-energized to effect a de-energization of the motor and thereby prepare the mechanism for another cycle of operations.

6. Power and manually operated means for operating the three speeds forward and reverse transmission of an automotive vehicle, said means comprising a throttle operating member, a vehicle speed responsive governor, a gear shift lever and a crank operably connected to the transmission and movable to one or the other of two positions to establish the transmission in certain settings, a pressure differential operated motor comprising a cylinder and a power element, force transmitting means, including a direction reversing means, interconnecting said power element and crank, a spring within the cylinder operable, when the motor is de-energized, to operate the force transmitting means to prepare said means for a subsequent transmission operating actuation of the crank, valve means for controlling the operation of said motor, means for actuating said valve means including a solenoid, and electrical means for controlling the operation of said solenoid including a switch operated by the throttle operating member, a selector switch operated by the gear shift lever, a switch operated by the governor and a switch operated by the crank, said switches being so constructed and so electrically interconnected that with a closure of the switch operated by the throttle operating member, a closure of the gear shift lever operated switch and a closure of the governor operated switch, the solenoid is energized and remains energized until the motor has completed its operation of establishing the transmission in gear, the transmission operating switch serving as the latter operation is being completed, to preselect an electrical circuit to prepare the electrical means for a subsequent operation of the solenoid, said preselecting operation also serving to break the electrical circuit then serving to maintain the solenoid energized.

7. Mechanism for establishing the change speed transmission of an automotive vehicle in first one and then the other of two of its settings, the friction clutch of the vehicle being automatically operated by said mechanism to facilitate said operations of the transmission, one of the settings of the transmission being effected when the speed of the vehicle is reduced to a certain factor and the other of said settings being effected when the speed of the vehicle is increased to a certain factor, said mechanism including a single acting transmission and clutch operating motor, valve means for controlling the operation of said motor, force transmitting means, including a direction changing mechanism, interconnecting the power element of the motor with a part of the transmission, and electrical means for controlling the operation of said valve means including a manually operated switch, a single pole double throw governor operated switch, electrical means interconnecting the latter two switches, a selector switch operated by the motor and including two fixed contacts and a movable contact, one of said fixed contacts being grounded and the other fixed contact being electrically connected to one of the fixed contacts of the governor operated switch, electrical means connecting, in series, the movable contact, a valve operated solenoid, a manually operated selector switch, and a battery, electrical conductor means connecting the solenoid with one of the fixed contacts of the governor operated switch, and a solenoid for operating the direction changing mechanism to disable said mechanism when the transmission is established in its second gear setting and the governor operated switch is established in one of its settings.

8. Mechanism for establishing the change speed transmission of an automotive vehicle in first one and then the other of two of its settings, the friction clutch of the vehicle being automatically operated by said mechanism to facilitate said operations of the transmission, one of the settings of the transmission being effected when the speed of the vehicle is reduced to a certain factor and the other of said settings being effected when the speed of the vehicle is increased to a certain factor, said mechanism including a single acting transmission and clutch operating motor, valve means for controlling the operation of said motor, force transmitting means, including a direction changing mechanism, interconnecting the power element of the motor with a part of the transmission, and electrical means for controlling the operation of said valve means including a manually operated switch, a single pole double throw governor operated switch, electrical means interconnecting the latter two switches, a selector switch operated by the motor and including two fixed contacts and a movable contact, one of said fixed contacts being grounded and the other fixed contact being electrically connected to one of the fixed contacts of the governor operated switch, electrical means connecting, in series, the movable contact, a valve operated solenoid, a manually operated selector switch, and a battery, electrical conductor means connecting the solenoid with one of the fixed contacts of the governor operated switch, a solenoid for operating the direction changing mechanism to disable said mechanism when the transmission is established in its second gear setting and the governor operated switch is established in one of its settings, and means for controlling the clutch engaging operation of the motor to effect a stage engagement of the clutch.

9. Mechanism for alternately effecting first one and then the other of two settings of a change speed transmission and for operating a friction clutch to facilitate said operation including a fluid pressure motor and an alternator mechanism interconnecting the motor and transmission, valve means for controlling the operation of said motor, and electrical means for controlling the operation of said valve means including a single pole double throw governor controlled switch, a manually operated switch electrically connected with the movable contact of the governor controlled switch, a power operated selector switch including a movable contact and a plurality of fixed contacts electrically connected to the governor operated switch, electrical means, including a battery and a valve operating solenoid, electrically connected in series with the movable contact of the selector switch, and electromagnetic means for controlling the operation of the alternator mechanism when the governor operated switch is established in a certain setting.

10. Mechanism for establishing the change speed transmission of an automotive vehicle in first one and then the other of two of its settings, the friction clutch of the vehicle being automatically operated by said mechanism to facilitate said operations of the transmissions, one of the disengaging operations, followed by one of the settings of the transmission, being effected when the speed of the vehicle is reduced to a certain factor and the other of said settings of the transmission, facilitated by a complete operation of the clutch, being automatically effected when the speed of the vehicle is increased to a certain factor, said mechanism including a single acting transmission and clutch operating motor, valve means for controlling the operation of said motor, force transmitting means, including a direction changing mechanism, interconnecting the power element of the motor with a part of the transmission, said direction changing mechanism being disabled when the speed of the vehicle is reduced to or below the first mentioned factor, and electrical means for controlling the operation of the valve means and the direction changing mechanism including a manually operated switch, a single pole double throw governor operated switch, a selector switch mechanism operated by the motor and a valve operating solenoid electrically connected in series with each other, and further including a solenoid for operating a part of the direction changing mechanism.

11. Mechanism for establishing the change speed transmission of an automotive vehicle in first one and then the other of two of its settings, the friction clutch of the vehicle being automatically operated by said mechanism to facilitate said operations of the transmission, one of the settings of the transmission being effected when the speed of the vehicle is reduced to a certain factor and the other of said settings being effected when the speed of the vehicle is increased to a certain factor, said mechanism including a single acting transmission and clutch operating motor operably connected to the clutch and to the transmission, valve means for controlling the operation of said motor, force transmitting means, including a direction changing mechanism, interconnecting the power element of the motor with a part of the transmission, and electrical means for controlling the operation of said valve means including a grounded manually operated switch, a single pole double throw governor operated switch comprising a plurality of fixed contacts, electrical means interconnecting the latter two switches, a selector switch operated by the motor including a plurality of fixed contacts and a movable contact, one of said fixed contacts being grounded, another of said fixed contacts being electrically connected to one of the fixed contacts of the governor operated switch and another of said fixed contacts being electrically connected to another of the fixed contacts of the governor operated switch, a valve operating solenoid, a grounded battery, electrical conductor means interconnecting a fixed contact of the motor operated selector switch, the solenoid and the battery; and other electrical conductor means interconnecting one of the fixed contacts of the latter switch with a part of the last mentioned electrical conductor means.

12. Mechanism for establishing the change speed transmission of an automotive vehicle in first one and then the other of two of its settings, the friction clutch of the vehicle being automatically operated by said mechanism to facilitate said operations of the transmission, one of the settings of the transmission being effected when the speed of the vehicle is reduced to a certain factor and the other of said settings being effected when the speed of the vehicle is increased to a certain factor, said mechanism including a single acting transmission and clutch operating motor, valve means for controlling the operation of said motor, force transmitting means, including a direction changing mechanism, interconnecting the power element of the motor with a part of the transmission, and electrical means for controlling the operation of said valve means including a manually operated switch, a single pole double throw governor operated switch including two fixed contacts, electrical means interconnecting the latter two switches, a selector switch operated by the motor and including four fixed contacts and a movable contact, one of said fixed contacts being grounded, another of said fixed contacts being electrically connected to one of the fixed contacts of the governor operated switch, and another of said fixed contacts being electrically connected to the other of the two fixed contacts of the governor operated switch, electrical means, connecting, in series, one of the four fixed contacts, a valve operated solenoid, a manually operated selector switch, and a battery; and electrical conductor means connecting a part of the latter electrical means with one of the fixed contacts of the governor operated switch.

13. Mechanism for alternately effecting first one and then the other of two settings of a change speed transmission and for operating a friction clutch to facilitate said operation including a fluid pressure motor and an alternator mechanism interconnecting the motor and transmission, valve means for controlling the operation of said motor, and electrical means for controlling the operation of said valve means including a single pole double throw governor controlled switch, a manually operated switch electrically connected with the movable contact of the governor controlled switch, a power operated selector switch including a movable contact and a plurality of fixed contacts electrically connected to the governor operated switch, electrical means, including a battery, a valve operating solenoid, and electrical conductor means, connected with the movable contact of the selector switch; and other electrical conductor means connecting a portion of the aforementioned electrical conductor means with one of the fixed contacts of the power operated switch to thereby provide means for shunting the latter switch to maintain an energization of the valve operating solenoid when the manually operated switch is closed and the governor operated switch is established in a certain setting.

14. Mechanism for alternately effecting first one and then the other of two settings of a change speed transmission and for operating a friction clutch to facilitate said operation including a fluid pressure motor and an alternator mechanism interconnecting the motor and transmission, valve means for controlling the operation of said motor, and electrical means for controlling the operation of said valve means including a single pole double throw governor controlled switch, a manually operated switch electrically connected with the movable contact of the governor controlled switch, a power operated selector switch including a movable contact and a plurality of fixed contacts electrically connected to the governor operated switch, electrical means, including a battery, a valve operating solenoid, and electrical conductor means, connected with the movable contact of the selector switch; other electrical conductor means connecting a portion of the aforementioned electrical conductor means with one of the fixed contacts of the power operated switch to thereby provide means for shunting the latter switch to maintain an energization of the valve operating solenoid when the manually operated switch is closed and the governor operated switch is established in a certain setting; and electromagnetic means for controlling the operation of the alternator mechanism when the governor operated switch is established in the latter setting.

EARL R. PRICE.

References Cited in the file of this patent

UNITED STATES PATENTS

| Number | Name | Date |
| --- | --- | --- |
| 1,773,216 | Campbell | Aug. 19, 1930 |
| 2,169,216 | Bloxsom | Aug. 15, 1939 |
| 2,187,824 | Britton | Jan. 23, 1940 |
| 2,208,828 | Adams | July 23, 1940 |
| 2,222,913 | Pescara | Nov. 26, 1940 |
| 2,223,406 | Chisholm | Dec. 3, 1940 |
| 2,234,463 | Brewer | Mar. 11, 1941 |
| 2,277,830 | Phillips | Mar. 31, 1942 |
| 2,327,063 | Randol | Aug. 17, 1943 |
| 2,487,482 | Schotz | Nov. 8, 1949 |
| 2,514,002 | Long | July 4, 1950 |
| 2,528,772 | Neracher | Nov. 7, 1950 |